United States Patent
Zhao et al.

(10) Patent No.: US 7,354,465 B2
(45) Date of Patent: Apr. 8, 2008

(54) DEVICE FOR COOLING AND HUMIDIFYING REFORMATE

(75) Inventors: Jian Lian Zhao, Belmont, MA (US); William F. Northrop, Ann Arbor, MI (US)

(73) Assignee: Nuvera Fuel Cells, Inc., Cambridge, MA (US)

( * ) Notice: Subject to any disclaimer, the term of this patent is extended or adjusted under 35 U.S.C. 154(b) by 0 days.

(21) Appl. No.: 11/156,919

(22) Filed: Jun. 20, 2005

(65) Prior Publication Data

US 2006/0039839 A1 Feb. 23, 2006

Related U.S. Application Data

(60) Provisional application No. 60/580,880, filed on Jun. 18, 2004.

(51) Int. Cl.
*C10L 3/00* (2006.01)
*B01J 8/02* (2006.01)

(52) U.S. Cl. .............. 48/197 R; 48/127.9; 48/119; 422/199; 422/211; 422/222; 165/133; 165/151; 165/182

(58) Field of Classification Search ........... 422/198, 422/199, 211, 222; 48/127.9, 119, 61, 62, 48/197 R; 429/19, 17, 20; 165/133, 151, 165/182
See application file for complete search history.

(56) References Cited

U.S. PATENT DOCUMENTS 6,077,620 A * 6/2000 Pettit ..................... 429/26
6,485,853 B1 * 11/2002 Pettit et al. ............. 429/17
6,544,494 B2 * 4/2003 Goebel et al. .......... 423/650
6,548,198 B2 * 4/2003 Foley et al. ............ 429/19
6,776,809 B2 * 8/2004 Shimazu .................. 48/76
6,832,645 B2 12/2004 Foley et al. ............ 165/60
6,866,951 B2 3/2005 Foley et al. ............ 429/17
7,063,131 B2 * 6/2006 Northrop ............... 165/133
2002/0006365 A1 * 1/2002 Maier-Roeltgen et al. .... 48/116
2003/0010481 A1 1/2003 Northrop ............... 165/168
2004/0226217 A1 * 11/2004 Ahmed et al. ......... 48/127.9

FOREIGN PATENT DOCUMENTS

| WO | WO 98/08771 | 3/1998 |
| WO | WO 00/66487 | 11/2000 |
| WO | WO 01/95409 A2 | 12/2001 |

* cited by examiner

*Primary Examiner*—N. Bhat
(74) *Attorney, Agent, or Firm*—Finnegan Henderson Farabow Garrett and Dunner, LLP (57) ABSTRACT

Devices for cooling and humidifying a reformate stream from a reforming reactor as well as related methods, modules and systems includes a heat exchanger and a sprayer. The heat exchanger has an inlet, an outlet, and a conduit between the inlet and the outlet. The heat exchanger is adapted to allow a flow of a first fluid (e.g. water) inside the conduit and to establish a heat exchange relationship between the first fluid and a second fluid (e.g. reformate from a reforming reactor) flowing outside the conduit. The sprayer is coupled to the outlet of the heat exchanger for spraying the first fluid exiting the heat exchanger into the second fluid.

31 Claims, 4 Drawing Sheets

DEVICE FOR COOLING AND HUMIDIFYING REFORMATE

CROSS REFERENCE TO RELATED APPLICATION

Under 35 U.S.C. § 119, this application claims priority to U.S. Provisional Application Ser. No. 60/580,880, filed Jun. 18, 2004, the contents of which are incorporated herein by reference.

STATEMENT REGARDING FEDERALLY SPONSORED RESEARCH

This invention was made with Government support under Contract No. DE-FC02-99EE50580 awarded by the U.S. Department of Energy. The Government has certain rights in this invention.

TECHNICAL FIELD

This invention relates to devices for cooling and humidifying a reformate, as well as related methods, modules, and systems.

BACKGROUND

A conventional fuel, such as liquid or gaseous hydrocarbons or alcohols, can be converted to hydrogen by a reforming process to provide an energy source to a fuel cell. In a typical reforming process, a fuel, water steam, and/or air are vaporized and mixed. The mixed gases are passed over a catalyst in a reforming reactor to convert the fuel into a reformate, i.e., a reforming reaction product that contains hydrogen, carbon monoxide, carbon dioxide, and unreacted water. Subsequently, carbon monoxide in the reformate is substantially removed by contacting the reformate with another catalyst. This reaction, referred to as the "water gas shift reaction," is typically done at two stages: a first high-temperature stage and a second low-temperature stage. The reaction at the high-temperature stage is normally conducted at a temperature significantly lower than that found in a reforming reactor. Thus, cooling of the reformate is required before the water gas shift reaction occurs at the high temperature stage.

SUMMARY

The invention features devices, modules, reforming systems, and methods for adding sufficient water to a reformate exiting a reforming reactor (also called a reformer) to cool the reformate to a pre-determined temperature and to obtain a desired steam to carbon ratio in the reformate before the reformate enters a shift reactor.

In one general aspect, the invention features a device that includes a heat exchanger and a sprayer. The heat exchanger has an inlet, an outlet, and a conduit between the inlet and the outlet. The heat exchanger is adapted to allow a flow of a first fluid (e.g., water) inside the conduit and to establish a heat exchange relationship between the first fluid and a second fluid (e.g., a reformate from a reforming reactor) flowing outside the conduit. The sprayer is coupled to the outlet of the heat exchanger for spraying the first fluid exiting the heat exchanger into the second fluid. The first fluid can have a first temperature before the heat exchange and the second fluid can have a second temperature before the heat exchange. The second temperature can be higher than the first temperature.

Embodiments of the above aspect of the invention may include one or more of the following features. The conduit of the heat exchanger can include a coiled tubing. A perforated plate, a baffle, or a foam material can be attached to the conduit (e.g., attached to the coiled tubing). The perforated plate can be perpendicular to the flow direction of the second fluid.

In another aspect, the invention features a module that includes a device as described above and a cylindrical wall enclosing the device. In some embodiments, the module includes a heat exchanger and a sprayer described above, as well as a cylindrical wall enclosing the heat exchanger and the sprayer. At least a part of the cylindrical wall defines a first mixing zone downstream of the heat exchanger. The cylindrical wall can further defines a second mixing zone upstream of the heat exchanger. In certain embodiments, a perforated plate, a baffle, or a foam material can be attached to the part of the wall defining the first or second mixing zone.

In still another aspect, the invention features a reforming system that includes a reforming reactor for producing a reformate stream having a first temperature (e.g., about 550° C. to about 800° C.); a shift reactor (e.g., a high temperature shift reactor) receiving the reformate stream; a heat exchanger disposed between the reforming reactor and the shift reactor; and a sprayer. The heat exchanger has an inlet, an outlet, and a conduit between the inlet and the outlet, and is adapted to allow a flow of water to pass inside the conduit and a flow of the reformate stream to pass outside the conduit. The water has a heat exchange relationship with the reformate stream and has a second temperature before the heat exchange lower than the first temperature. The sprayer is coupled to the outlet of the heat exchanger for spraying the water exiting the heat exchanger into the reformate stream.

In some embodiments, the reformate stream can have a temperature of about 350° C. to about 500° C. upon entering the shift reactor.

In some embodiments, the reformate stream can transfer to the water at least about 5 kilowatts (e.g., at least about 8 kilowatts, at least about 10 kilowatts, or at least about 13 kilowatts) of heat per liter of a heat exchange volume at a fuel input rate to the reforming reactor of about 200 kilowatts. The term "heat exchange volume" refers to the volume between an outlet of the reforming reactor and an inlet of the shift reactor.

In some embodiments, the reformate can have a pressure drop of less than about 15 psi (e.g., less than about 10 psi, less than about 5 psi, less than about 3 psi, or less than about 1 psi) at a fuel input rate to the reforming reactor of about 200 kilowatts. The term "pressure drop" refers to the difference between the pressure of the reformate exiting the reforming reactor and the pressure of the reformate entering the shift reactor.

In a further aspect, the invention features a method that includes passing a flow of water having a first temperature inside a heat exchanger, in which the water has a heat exchange relationship with a reformate stream flowing outside the heat exchanger and the reformate stream has a second temperature before the heat exchange (e.g., about 550° C. to about 800° C.) higher than the first temperature; and mixing the water exiting the heat exchanger with the reformate stream, thereby humidifying the reformate stream and cooling the reformate stream to a desired temperature (e.g., about 350° C. to about 500° C.). The mixing step can include spraying the water into the reformate stream. In some embodiments, the reformate stream can flow in a direction opposite to the flow of the water.

Embodiments can provide one or more of the following advantages.

In some embodiments, the reforming systems described above have a low density, e.g., less than about 1 kg per liter of a heat exchange volume. For a given heat exchange volume, the reforming system described above weighs less than a conventional reforming system.

In some embodiments, the reforming systems described above impose a low pressure drop on the reformate stream. For example, the reformate stream can have a pressure drop of less than about 15 psi at a fuel input rate to the reforming reactor of about 200 kilowatts. In general, lower pressure drop allows the reforming systems to operate at a lower pressure and reduces energy consumption.

In some embodiments, the reforming systems described above allow the reformate stream to transfer to the water a large amount of heat, for example, at least about 13 kilowatts of heat per liter of a heat exchange volume at a fuel input rate to the reforming reactor of about 200 kilowatts.

In some embodiments, the reforming systems described above have a high heat transfer rate. For example, the reformate stream flows pass the heat exchanger in no more than about 0.02 seconds at a fuel input rate to the reforming reactor of about 200 kilowatts.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

The present invention may be more readily understood with frequent reference being made to the appended drawings where.

Like reference symbols in the various drawings indicate like elements.

DETAILED DESCRIPTION

While the present invention can be embodied in many different forms, this disclosure describes in detail at least one preferred embodiment and possible alternative embodiments of the invention with the understanding that the present disclosure is to be considered merely an exemplification of the principles of the invention and is not intended to limit the broad aspect of the invention to the specific embodiments illustrated. It should be noted that the term "water" mentioned herein includes both liquid water and a mixture of liquid water and steam, unless otherwise stated or implied by context.

Figure 1:
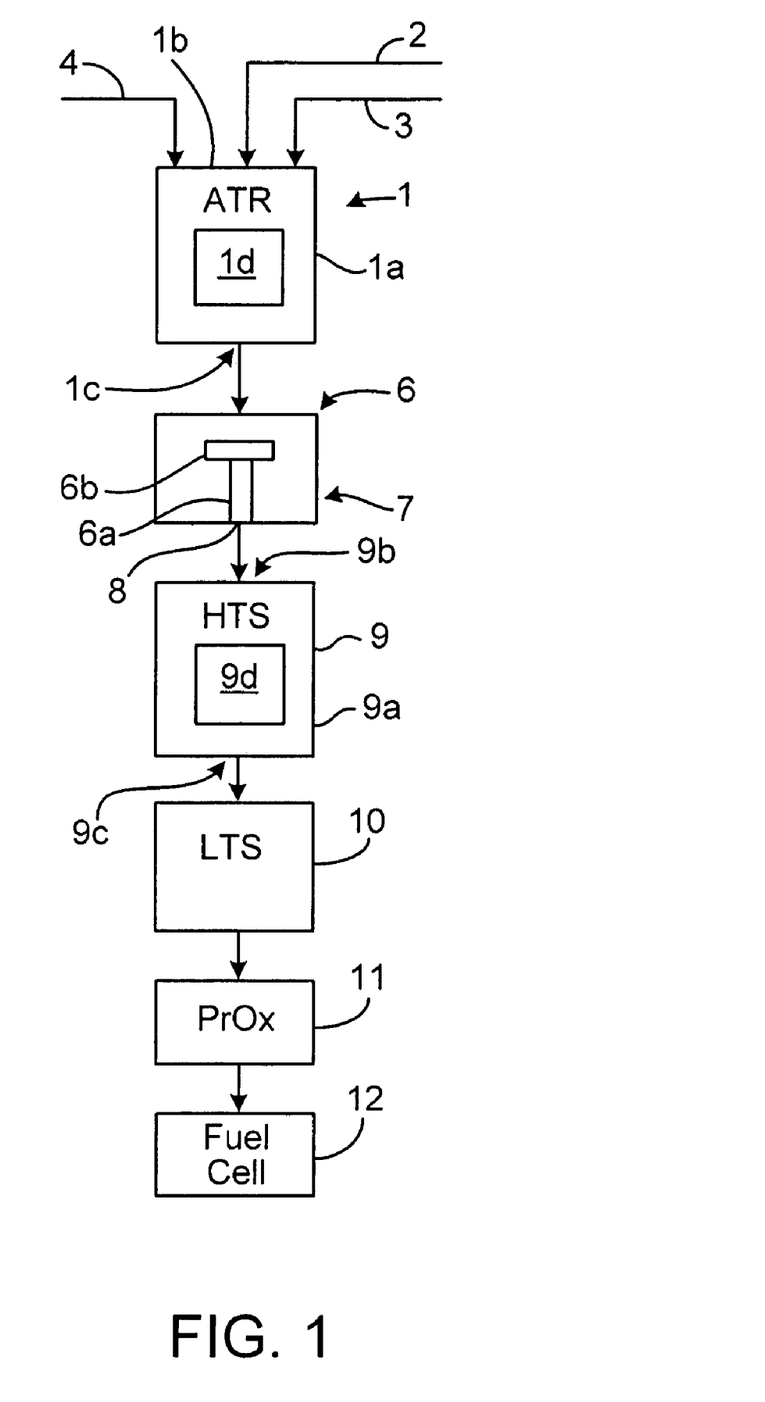
FIG. 1 is a schematic representation of an embodiment of a reforming system.

FIG. 1 illustrates an exemplary reforming system. The reforming system includes, among others, an autothermal reformer 1 ("ATR"), a heat exchanger 6 ("HX"), a high temperature shift reactor 9 ("HTS"), a low temperature shift reactor 10 ("LTS"), a preferential oxidation reactor 11 ("PrOx"), and a fuel cell 12.

Autothermal reformer 1 includes a housing 1*a*, an inlet 1*b*, an outlet 1*c*, and catalyst 1*d*, and is configured to produce a reformate stream. An example of a suitable reforming catalyst is a combination of nickel and a noble metal on a support. Examples of suitable noble metals include cobalt, platinum, palladium, rhodium, ruthenium, and iridium. Examples of suitable supports include magnesia, magnesium aluminate, alumina, silica, and zirconia. Examples of autothermal reformer 1 are described in U.S. patent application Ser. No. 11/132,157, the contents of which are incorporated herein by reference. In some embodiments, autothermal reformer 1 can be replaced by a pure steam reformer, a partial oxidation reformer, or any other suitable reformers.

High temperature shift reactor 9 is positioned downstream of the reformer 1. It includes a housing 9*a*, an inlet 9*b*, an outlet 9*c*, and a high temperature shift catalyst 9*d*. Examples of suitable high temperature shift catalysts include transition metal oxides (e.g., ferric oxide or chromic oxide) and supported platinum group metals (e.g., supported platinum or supported palladium). The catalyst can be deposited on the surface of a monolithic honeycomb structure or can be deposited on other suitable supports. Examples of high temperature shift reactor 9 are described in WO 00/66487 and WO 98/08771, the contents of which are incorporated herein by reference. In some embodiments, high temperature shift reactor 9 can be removed.

Heat exchanger 6 is disposed between autothermal reformer 1 and high temperature shift reactor 9. It includes an inlet 7, an outlet 8, and a conduit 6*a*. The heat exchange outlet 8 can be coupled with a sprayer 6*b*. Devices, modules, and reforming systems containing the combination of heat exchanger 6 and the sprayer are described in greater detail below.

Designs of low temperature shift reactor 10, preferential oxidation reactor 11, and fuel cell 12 are know in the art, such as those described in U.S. patent application Ser. No. 09/562,787, U.S. patent application Ser. No. 09/563,676, and U.S. Pat. No. 6,022,634, the contents of which are incorporated herein by reference.

During operation, feeds of water steam 2, air 3, and fuel 4 are delivered to autothermal reformer 1 via inlet 1*b*. In autothermal reformer 1, the fuel and the water are converted through a reforming reaction into hydrogen, carbon monoxide, and carbon dioxide in the presence of the reforming catalyst 1*d*. Oxidation reaction between the air and the fuel can generate the heat needed for the reforming reaction. The temperature of the reformate at an outlet 1*c* of autothermal reformer 1 can be about 550° C. to about 800° C. (e.g., about 700° C.). The reformate is then sent to heat exchanger 6. A flow of water (a portion of which may be in the form of steam) is delivered into heat exchanger 6 through inlet 7, passes inside the conduit 6*a* of heat exchanger 6, exits heat exchanger 6 through outlet 8. The water exiting outlet 8 is subsequently injected by the sprayer 6*b* into the reformate stream that passes outside the conduit 6*a*, thereby humidifying the reformate. The liquid water exiting the heat exchange outlet 8 is evaporated through contact with the reformate and contacting with the hot surface of heat exchanger 6. The reformate stream is thereby cooled by the water inside the conduit 6*a* of heat exchanger 6 and the water sprayed into it while being delivered to high temperature shift reactor 9. The temperature of the reformate before entering high temperature shift reactor 9 can be in the range of about 300° C. to about 500° C. The amount of the water added into the reformate is pre-determined to obtain a desired steam to carbon ratio for the subsequent shift reaction. A desired steam to carbon ratio can be in the range of 2-4.

Generally, the reformate stream passes the heat exchanger 6 in an amount of time that is inversely related to a reformer operating power. For example, at a full operating power of about 200 kW (i.e., at a fuel input rate to the reforming reactor of about 200 kilowatts), the reformate stream passes the heat exchanger 6 in no more than about 0.02 seconds (e.g., no more than about 0.01 second). At this operating power, the heat exchanger 6 can have a heat exchange capacity of at least about 5 kilowatts (e.g., at least about 8 kilowatts, at least about 10 kilowatts, or at least about 13 kilowatts) per liter of a heat exchange volume. The heat exchange volume refers to the volume between the outlet 1c of reformer 1 and the inlet 9b of high temperature shift 9.

Figure 2:
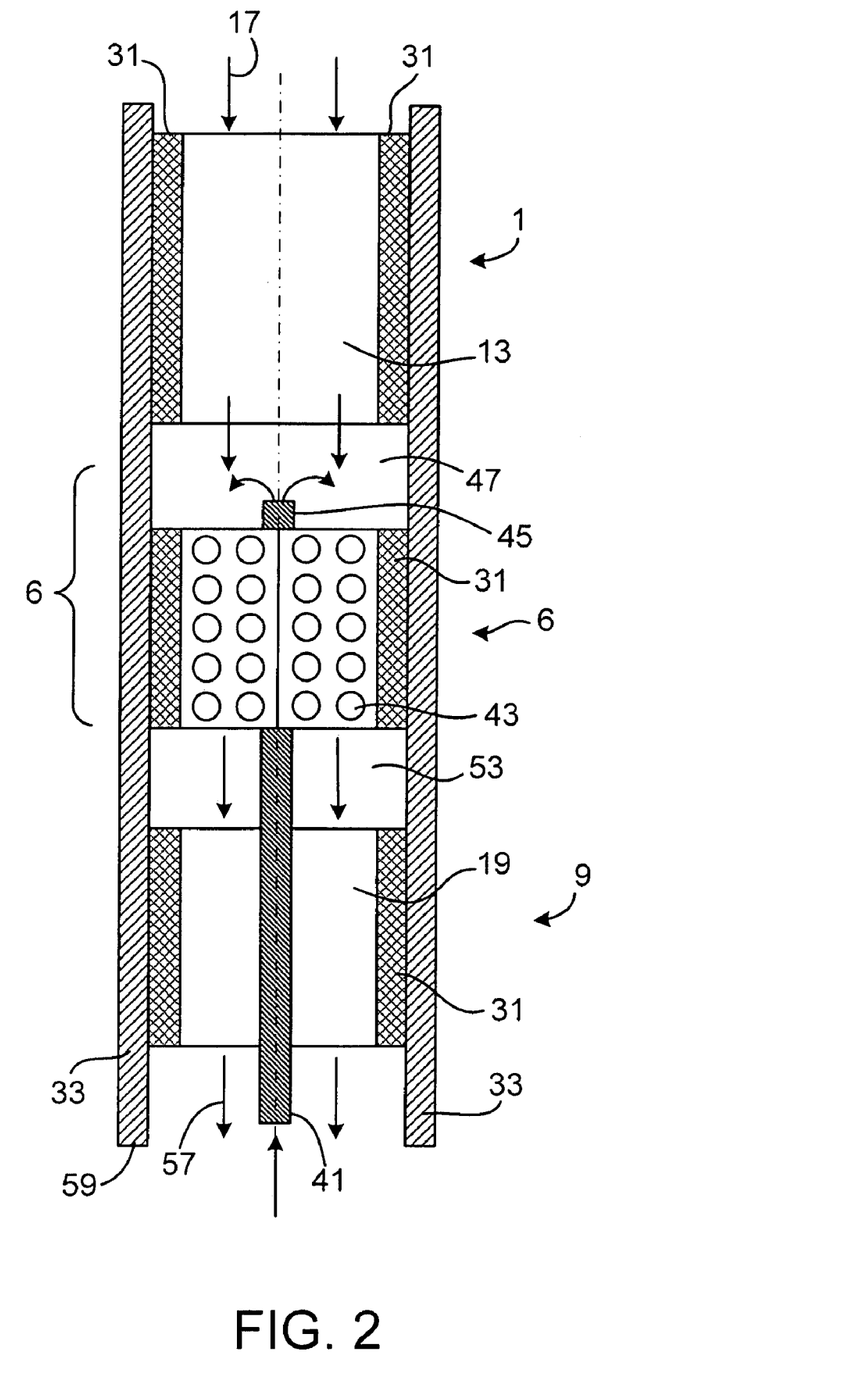
FIG. 2 is a schematic cross-sectional view of an embodiment of a reforming system.

FIG. 2 shows an autothermal reformer 1 including a catalyst bed 13 and a high temperature shift reactor 9 including a catalyst bed 19. Both autothermal reformer 1 and high temperature shift reactor 9 are surrounded by insulation 31 and then placed into a common carrier having an end 59 and a cylindrical wall 33. Water, air, and fuel are fed into autothermal reformer 1 and indicated as input flow 17 in FIG. 2. A heat exchanger 6 is disposed between autothermal reformer 1 and high temperature shift reactor 9. Heat exchanger 6 includes a water inlet tubing 41 passing through catalyst bed 19 and a section of a coiled tubing 43. A sprayer 45 is coupled to the outlet of heat exchanger 6. The cylindrical wall 33, heat exchanger 6, and autothermal reformer 1 define a mixing space 47. The cylindrical wall, heat exchanger 6, and high temperature shift reactor 9 define a mixing space 53.

During operation, a pre-determined amount of water is fed into the heat exchanger 6 via water inlet tubing 41. The amount of the water is sufficient to cool the reformate to a desired temperature and to obtain an appropriate steam to carbon ratio in the reformate. The water then enters coiled tubing 43 and passes generally upstream, i.e., towards autothermal reformer 1. The water, typically at least partially converted to steam inside coiled tubing 43, is then sprayed through sprayer 45 into mixing space 47. In mixing space 47, the sprayed water mixes with the reformate and the mixture is carried downstream past coiled tubing 43. Water droplets in the mixture readily evaporate both by the heat exchange with the hot reformate and by the heat exchange with the hot surface of coiled tubing 43 (typically made of metals). The cooled and humidified reformate then enters mixing space 53. Mixing space 53 can optionally contain perforated plates, baffles, or foam materials attached to the part of the cylindrical wall 33 of the common carrier to promote turbulence, thereby resulting in a uniform mixture. The cooled and humidified reformate then enters the high temperature shift reactor 9. After a high temperature shift reaction, the shifted reformate 57 leaves the common carrier 33 at its end 59 and is collected for further processing.

Figure 3:
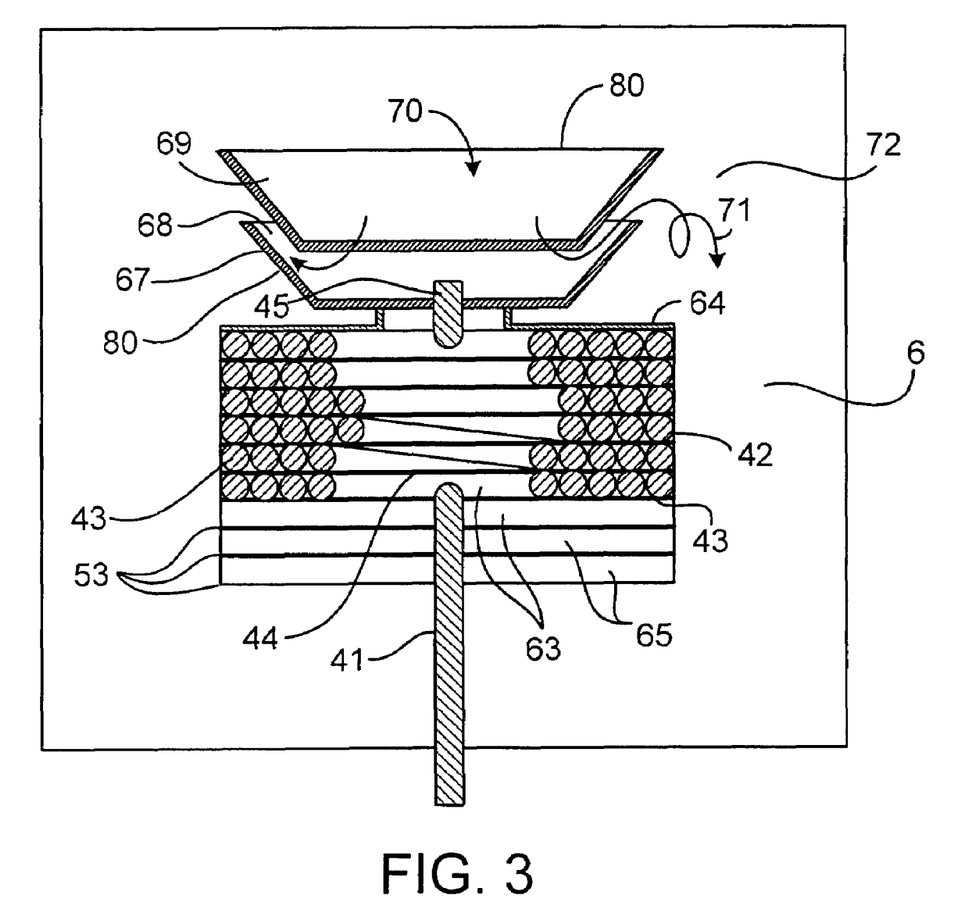
FIG. 3 is a cross-sectional view of an embodiment of a module for cooling and humidifying a reformate.

FIG. 3 illustrates a cross-section of one embodiment of a module for cooling and humidifying a reformate. The module includes a heat exchanger 6 and a sprayer 45. Heat exchanger 6 includes a water inlet tubing 41 and a coiled tubing 43. Water inlet tubing 41 passes through a series of perforated plates 65 in a lower mixing zone 53 and is bent to form a coiled tubing 43. A series of perforated plates 63 is attached to coiled tubing 43. A perforated plate 64 is attached to an upper mixing zone above coiled tubing 43. The upper mixing zone can be defined by the wall of the module and/or the wall of a reforming reactor (not shown in FIG. 3). The upper mixing zone includes two funnel-shaped metal plates 80 that defines a first mixing cavity 67, a second mixing cavity 69, an outlet area 68, and an annular turbulent zone 71. Coiled tubing 43 preferably has multiple turns in a plane and rises through perforated plates 63 via either an outer tubing transition portion 42 or an inner tubing transition portion 44. Sprayer 45 is an outlet tubing and is coupled to coiled tubing 43 at its end. The space in the module forms a cooling and humidifying zone 72, which is typically downstream of a reforming reactor (not shown in FIG. 3) and upstream of a high temperature shift reactor (not shown in FIG. 3).

In zone 72, reformate stream 70 from the reforming reactor is cooled to a desired temperature and humidified to provide an appropriate steam to carbon ratio. Specifically, sprayer 45 sprays water into first mixing cavity 67 in zone 72. Reformate stream 70 enters second mixing cavity 69 and is deflected into first mixing cavity 67. The water spray and reformate stream 70 forms a reformate-water mixture in first mixing cavity 67. The mixture then exits first mixing cavity 67 at outlet area 68 and enters annular turbulent zone 71, in which it is further mixed. The mixture flows through heat exchanger 6 by passing outside coiled tubing 43 via perforated plate 64 above coiled tubing 43, perforated plates 63 attached to coiled tubing 43, and perforated plates 65 in the lower mixing zone 53. Perforated plates 63, 64, and 65 stabilize the arrangement of coiled tubing 43 and enhance the mixing of water with the reformate. The perforations on plates 63 are generally under coiled tubing 43 to allow the mixture to pass through while establishing a heat exchange relationship with the water in coiled tubing 43. The perforations on plates 63 are typically not in the center of heat exchanger 6, where there is no coiled tubing 43. In this embodiment, perforated plates 63, 64, and 65 are perpendicular to the flow direction of the reformate-water mixture. The reformate-water mixture passes through perforations, transferring heat to the water in coiled tubing 43 and to the water sprayed into the reformate before entering lower mixing zone 53. In some embodiments, perforated plates 63, 64, and 65 can be replaced by one or more baffles or by foamed materials attached to coiled tube 43. In certain embodiments, the module described above does not contain perforated plates 63, 64, and 65.

Figure 4:
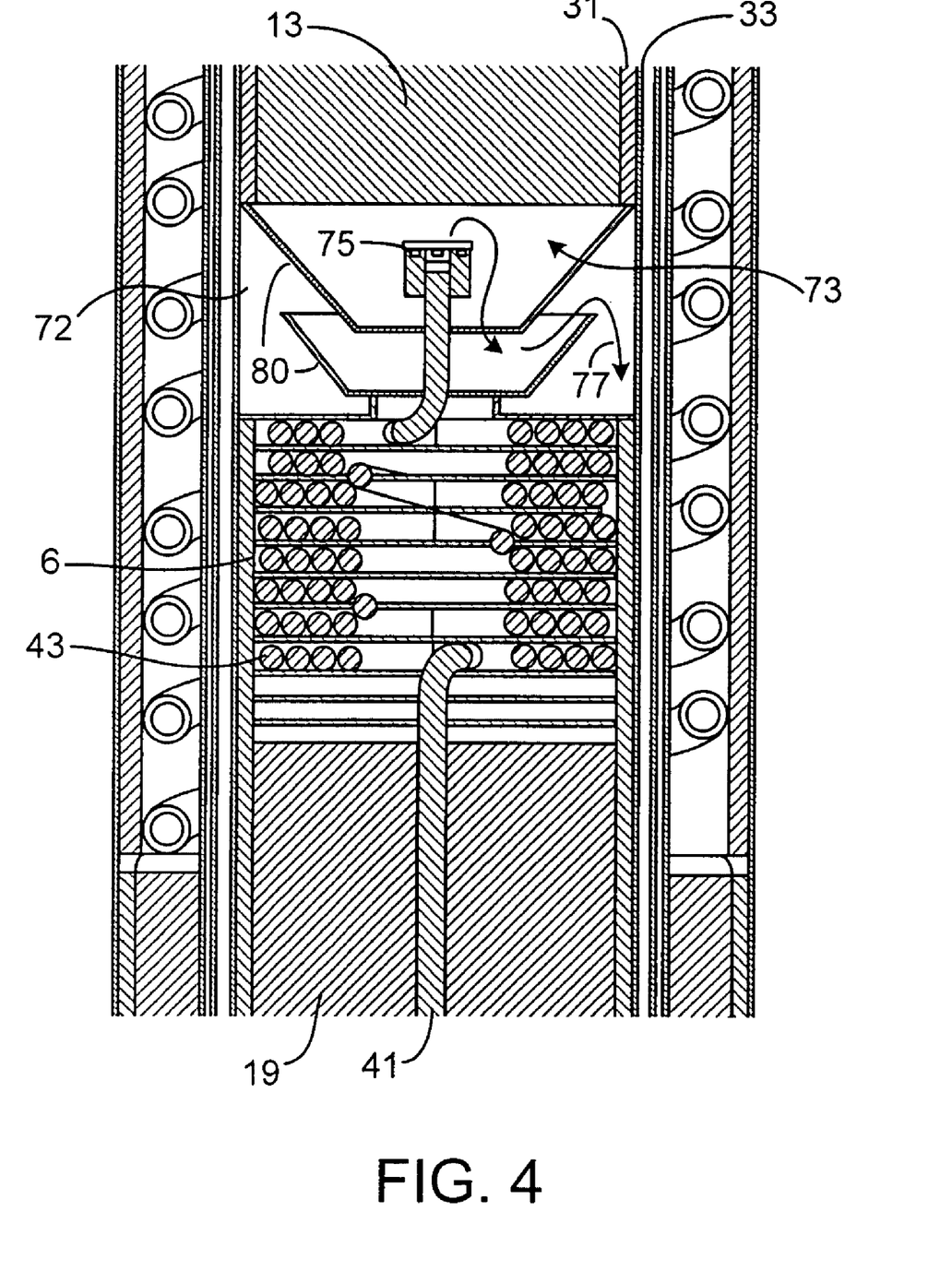
FIG. 4 is a cross-sectional view of another embodiment of a reforming system.

FIG. 4 illustrates a cross-section of another embodiment of a reforming system. The reforming system includes a heat exchanger 6 between an autothermal reforming catalyst bed 13 and a high temperature shift catalyst bed 19. Both catalyst beds 13 and 19 are surrounded by insulation 31 and placed into a common carrier having a cylindrical wall 33. The space between catalyst beds 13 and 19 forms a cooling and humidifying zone 72. Heat exchanger 6 is placed in zone 72. It includes a water inlet tubing 41 and a coiled tubing 43, and is coupled with a sprayer 75. Sprayer 75 is an outlet tubing having a diameter larger than that of coiled tubing 43. Sprayer 75 is sealed at the end of the tubing and contains a plurality of openings on the wall near the sealed end so that water in coiled tubing 43 can only exits from these openings. Two funnel-shaped metal plates 80 are disposed between heat first mixing zone 73 and a second mixing zone 77. Sprayer 75, first mixing zone 73, and second mixing zone 77 together facilitate the mixing between sprayed water and a reformate.

An example of assembling the reforming system shown in FIG. 4 is described below. Catalyst bed 13, with insulation 31, is first inserted into the common carrier until it contacts a first end plate (not shown). Water inlet tube 41 of heat exchanger 6 is then inserted into a hole in high temperature shift catalyst bed 19 to form a combination. Subsequently, the combination of heat exchanger 6 and high temperature shift catalyst bed 9 is inserted into the common carrier until catalyst bed 13 is contacted by the upper edge of funnel-shaped metal plates 80. A second end plate (not shown) is added to seal the common carrier 33. The resulting assembly is highly resistant to thermal stress. It can also be readily assembled and disassembled. Specifically, as each component of the assembly (e.g., catalyst bed 13, heat exchanger 6, catalyst bed 19) can be modularized, if one component malfunctions, one of the first and second end plates can be removed and the malfunctioned component can be removed and replaced with a working component.

In the embodiment shown in FIG. 4, the residence time of reformate stream is about 0.01 seconds at full power of 200 kW. At that power level, about 20 kW of thermal energy is transferred from the reformate to the water in a heat exchange volume of about 1.5 liter.

An advantage of the embodiments shown in FIGS. 2-4 is that a water spray/reformate mixture flows through the body of the sprayer and the heat exchanger, which are typically made of metals. The metal surfaces of the sprayer and the heat exchanger are heated by the hot reformate and therefore have an elevated temperature. Water droplets in the water spray/reformate mixture contact the metal surface and vaporize readily since heat transfer from metal surface to the water droplets is faster than heat transfer from the reformate to the water droplets. Thus, flowing the water spray/reformate mixture through the module or systems shown in FIGS. 2-4 enhances liquid water vaporization and facilitates rapid heat transfer between the reformate and the cooling water.

Although the heat exchangers described above are composed primarily of coiled tubing 43, they can be of any suitable design known in the art that achieves the desired heat transfer capacity and residence time, as well as complete evaporation of the sprayed water. Examples of suitable heat exchangers includes a plate-and-frame heat exchanger, a fin-tube heat exchanger, a shell-tube heat exchanger, and a perforated fin-tube heat exchanger (such as those described in U.S. Patent Application Publication No. 2003/0010481, the contents of which are incorporated herein by reference).

Once in possession of this description of the invention, a variety of combinations and variations can be envisaged by one of ordinary skill in the art. While the invention has been shown and described with reference to the preferred embodiments, it will be understood by those skilled in the art that various changes in form and detail may be made therein without departing from the spirit and scope of the invention as defined by the appended claims.

What is claimed is:

1. A method, comprising:
    passing a flow of water having a first temperature inside a coiled tubing having a perforated plate attached thereon in a heat exchanger, the water having a heat exchange relationship with a reformate stream flowing outside the heat exchanger, the reformate stream having a second temperature before the heat exchange higher than the first temperature; and
    mixing the water exiting the heat exchanger with the reformate stream, thereby humidifying the reformate stream and cooling the reformate stream to a desired temperature.

2. The method of claim 1, wherein the second temperature is about 550 C. to about 800° C.

3. The method of claim 1, wherein the desired temperature is about 350° C. to about 500° C.

4. The method of claim 1, wherein the mixing step comprises spraying the water into the reformate stream.

5. The method of claim 1, wherein the reformate stream flows in a direction opposite to the flow of the water.

6. A device, comprising:
    a heat exchanger having an inlet, an outlet, and a conduit between the inlet and the outlet, the heat exchanger being adapted to allow a flow of a first fluid inside the conduit and to establish a heat exchange relationship between the first fluid and a second fluid flowing outside the conduit and the conduit comprising a coiled tubing;
    a perforated plate attached to the coiled tubing; and
    a sprayer coupled to the outlet of the heat exchanger for spraying the first fluid exiting the heat exchanger into the second fluid.

7. The device of claim 6, wherein the perforated plate is perpendicular to the flow direction of the second fluid.

8. The device of claim 6, further comprising a baffle or a foam material attached to the conduit.

9. The device of claim 6, wherein the heat exchanger is adapted to allow a flow of water inside the conduit.

10. The device of claim 6, wherein the heat exchanger is adapted to establish a heat exchange relationship between the first fluid and a reformate flowing outside the conduit.

11. The device of claim 6, wherein the first fluid has a first temperature before the heat exchange and the second fluid has a second temperature before the heat exchange, the second temperature being higher than the first temperature.

12. A module, comprising:
    a heat exchanger having an inlet, an outlet, and a conduit between the inlet and the outlet, the heat exchanger being adapted to allow a flow of a first fluid inside the conduit and to establish a heat exchange relationship between the first fluid and a second fluid flowing outside the conduit and the conduit comprising a coiled tubing;
    a perforated plate attached to the coiled tubing;
    a sprayer coupled to the outlet of the heat exchanger for spraying the first fluid exiting the heat exchanger into the second fluid; and
    a cylindrical wall enclosing the heat exchanger and the sprayer, at least a part of the wall defining a first mixing zone downstream of the heat exchanger.

13. The module of claim 6, wherein the perforated plate is perpendicular to the flow direction of the second fluid.

14. The module of claim 12, further comprising a baffle or a foam material attached to the conduit.

15. The module of claim 12, further comprising a perforated plate, a baffle, or a foam material attached to the part of the wall defining the first mixing zone.

16. The module of claim 12, wherein the cylindrical wall further defines a second mixing zone upstream of the heat exchanger.

17. The module of claim 16, further comprising a perforated plate, a baffle, or a foam material attached to the part of the wall defining the second mixing zone.

18. A reforming system, comprising:
    a reforming reactor for producing a reformate stream having a first temperature;
    a shift reactor receiving the reformate stream;
    a heat exchanger disposed between the reforming reactor and the shift reactor, the heat exchanger having an inlet, an outlet, and a conduit between the inlet and the outlet, and being adapted to allow a flow of water to pass inside the conduit and a flow of the reformate stream to pass outside the conduit, the water having a heat exchange relationship with the reformate stream and having a second temperature before the heat exchange lower than the first temperature and the conduit comprising a coiled tubing;

a perforated plate attached to the coiled tubing; and a sprayer coupled to the outlet of the heat exchanger for spraying the water exiting the heat exchanger into the reformate stream.

19. The system of claim 18, wherein the perforated plate is perpendicular to the flow direction of the reformate stream.

20. The system of claim 18, further comprising a baffle or a foam material attached to the conduit.

21. The system of claim 18, wherein the first temperature is about 550° C. to about 800° C.

22. The system of claim 18, wherein the reformate stream has a temperature of about 350° C. to about 500° C. upon entering the shift reactor.

23. The system of claim 18, wherein the reformate stream transfers to the water at least about 5 kilowatts of heat per liter of a heat exchange volume at a fuel input rate to the reforming reactor of about 200 kilowatts.

24. The system of claim 18, wherein the reformate stream transfers to the water at least about 8 kilowatts of heat per liter of a heat exchange volume at a fuel input rate to the reforming reactor of about 200 kilowatts.

25. The system of claim 18, wherein the reformate stream transfers to the water at least about 10 kilowatts of heat per liter of a heat exchange volume at a fuel input rate to the reforming reactor of about 200 kilowatts.

26. The system of claim 18, wherein the reformate stream transfers to the water at least about 13 kilowatts of heat per liter of a heat exchange volume at a fuel input rate to the reforming reactor of about 200 kilowatts.

27. The system of claim 18, wherein the reformate has a pressure drop of less than about 15 psi at a fuel input rate to the reforming reactor of about 200 kilowatts.

28. The system of claim 18, wherein the reformate has a pressure drop of less than about 10 psi at a fuel input rate to the reforming reactor of about 200 kilowatts.

29. The system of claim 18, wherein the reformate has a pressure drop of less than about 5 psi at a fuel input rate to the reforming reactor of about 200 kilowatts.

30. The system of claim 18, wherein the reformate has a pressure drop of less than about 3 psi at a fuel input rate to the reforming reactor of about 200 kilowatts.

31. The system of claim 18, wherein the reformats has a pressure drop of less than about 1 psi at a fuel input rate to the reforming reactor of about 200 kilowatts.

* * * * *

UNITED STATES PATENT AND TRADEMARK OFFICE
CERTIFICATE OF CORRECTION

| | | |
|---|---|---|
| PATENT NO. | : 7,354,465 B2 | Page 1 of 1 |
| APPLICATION NO. | : 11/156919 | |
| DATED | : April 8, 2008 | |
| INVENTOR(S) | : Jian Lian Zhao et al. | |

It is certified that error appears in the above-identified patent and that said Letters Patent is hereby corrected as shown below:

In claim 2, column 7, line 61, "550 C." should read --550° C.--.

In claim 31, column 10, line 20, "reformats" should read --reformate--.

Signed and Sealed this

Eighth Day of December, 2009

David J. Kappos
*Director of the United States Patent and Trademark Office*